G. E. HALLENBECK.
MACHINE TOOL STRUCTURE.
APPLICATION FILED MAY 15, 1918.

1,297,463.                                     Patented Mar. 18, 1919.

INVENTOR
Geo. E. Hallenbeck
BY
Geo. E. Kirk
ATTORNEY

UNITED STATES PATENT OFFICE.

GEORGE E. HALLENBECK, OF TOLEDO, OHIO, ASSIGNOR TO BAKER BROTHERS, OF TOLEDO, OHIO, A FIRM.

MACHINE-TOOL STRUCTURE.

1,297,463.     Specification of Letters Patent.     Patented Mar. 18, 1919.

Application filed May 15, 1918. Serial No. 234,636.

*To all whom it may concern:*

Be it known that I, GEORGE E. HALLENBECK, a citizen of the United States of America, residing at Toledo, Lucas county, Ohio, have invented new and useful Machine-Tool Structures, of which the following is a specification.

This invention relates to work tables.

This invention has utility when incorporated in features for ready adjustment and removal of work tables, especially in machine tools.

Referring to the drawings.

Figure 1:
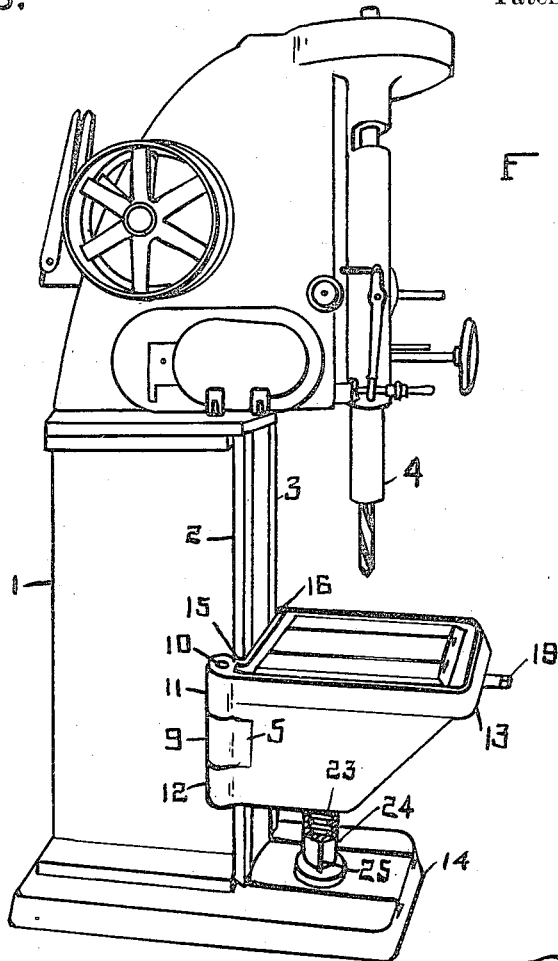
Figure 1 is a perspective view of an embodiment of the invention in a machine tool.
Figure 2:
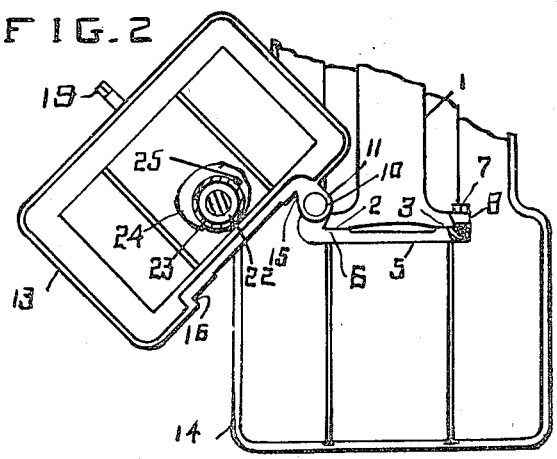
Fig. 2 is a plan view of the work table of Fig. 1 swung away from position for holding work to oppose the tool.
Figure 3:
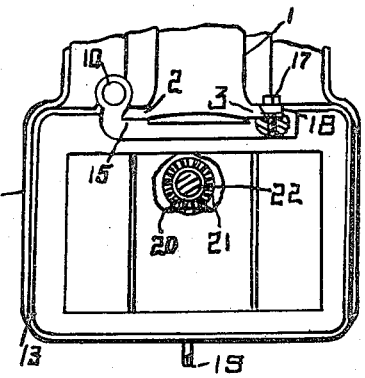
Fig. 3 is a view similar to Fig. 2, but with the table swung into position in front of the column for carrying work while operated upon by the rotating tool.

The machine tool column 1 is shown as provided with a pair of vertically extending guides 2, 3, parallel to each other and disposed laterally of the rotatable tool holder 4. Bracket member 5 is provided with seat 6 which may coact with the guide 2. The position of the bracket member 5 on the column 1 is readily fixed by clamping this member 5 to the guides 2, 3. Adjacent the guide 3, bolts 7 threaded in member 5 may draw the gib 8 against the beveled rearward side of the guide 3 and firmly frictionally mount the bracket 5 in the desired vertical position on the column 1.

The bracket member is provided adjacent the guide 2 with a rearwardly projecting ear 9 carrying vertically extending pivot pin 10 coacting with ears 11, 12 of work table 13 horizontally swingable on this hinge support to give clearway on base 14 opposing the tool holder 4. The position of the pin 10 is such as to the rearward bevel side of the guide 2, that seat portion 15 of the table member 13 may clear the guide 2 in outward swing, and move thereagainst on inward travel, to aline with seat 6 of the bracket member 5. That is, the line of the rearwardly extending face of the seat 15 should be a right angle, or more open, with a line theretoward from the axis of the pin 10. Seat 16 of table 13, may have bolts 17 threaded in the table 13, draw gib 18 against the rearwardly extending bevel face of the guide 3, and thus fixedly clamp the work table 13 in position rigid with the column 1 for carrying work in position to oppose the rotary tool holder 4.

In instances of heavy work, additional rigidity in operation may be given the table 13 by providing it with an adjustable foot or supplementary support. By rotating shaft 19 in member 13, bevel pinion 20, in mesh with bevel pinion 21 on vertical shaft 22, causes threaded portion 23 of shaft 22 to reciprocate the foot providing nut 24 having spline connection 25 with the table 13. Accordingly, the gibs 8, 18, may be loosened and the table readily adjusted to a desired vertical position, and then each gib tightened. Should it be desired to have clearance for handling work on base 14 instead of on table 13, there is conveniently such range of use permitted by merely loosening gib 18 and swinging the table 13 on hinge pin 10 clear from opposing the holder 4. Clamp bolt ways as an instance of holding means being provided in the base 14, serve as in the table 13, for with table 13 clear from opposing the tool, there is as ready mounting of work in fixed position as to the tool upon the base 14, as upon the table.

What is claimed and it is desired to secure by Letters Patent is:

1. A machine tool comprising a frame having vertical ways, a slide mounted upon said ways, a work table hinged upon said slide to swing in a horizontal plane and means on the work table to engage the ways to hold the table in operative position.

2. A machine tool comprising a frame having vertical guide means, a slide mounted upon said guide means, a holder hinged upon said slide to swing in a horizontal plane away from the guide means, and means on the holder for locking the holder in position by engaging the guide means.

In witness whereof I affix my signature.

GEO. E. HALLENBECK.